United States Patent [19]
Hoyle et al.

[11] 3,906,101
[45] Sept. 16, 1975

[54] PHARMACEUTICAL COMPOSITIONS CONTAINING SUBSTITUTED 5-NITROFURFURYLIDENEAMINO-OXAZOLIDINONES

[75] Inventors: William Hoyle, Bramhall; Michael Philip Savage, Heald Green, both of England

[73] Assignee: Ciba-Geigy Corporation, Ardsley, N.Y.

[22] Filed: June 15, 1972

[21] Appl. No.: 263,046

Related U.S. Application Data

[62] Division of Ser. No. 43,586, June 4, 1970, Pat. No. 3,686,170.

[30] Foreign Application Priority Data
June 5, 1969 United Kingdom............... 28421/69

[52] U.S. Cl. ................................................. 424/272
[51] Int. Cl.² ......................................... A61K 31/42
[58] Field of Search ..................................... 424/272

[56] References Cited
UNITED STATES PATENTS

| | | | |
|---|---|---|---|
| 3,470,164 | 9/1969 | Takamatsu.......................... | 424/272 |
| 3,634,412 | 1/1972 | Breuer................................ | 424/272 |

*Primary Examiner*—V. D. Turner
*Attorney, Agent, or Firm*—Joseph G. Kolodny; John J. Maitner; Theodore O. Groeger

[57] ABSTRACT

Compounds of the class of 5-substituted carbamoyloxymethyl-3-(5-nitrofurfurylideneamino)-2-oxalidinones have antimicrobial properties; compositions containing such compounds and methods for the treatment of microbial infections and protecting organic material against microbial attack are provided; a typical embodiment is 5-methylcarbamoyloxymethyl-3-(5-nitrofurfurylideneamino)-2-oxazolidinone.

3 Claims, No Drawings

PHARMACEUTICAL COMPOSITIONS CONTAINING SUBSTITUTED 5-NITROFURFURYLIDENEAMINO-OXAZOLIDINONES

This is a division, of application Ser. No. 43,586, filed June 4, 1970 now U.S. Pat. No. 3,686,170.

DETAILED DESCRIPTION

The present invenion relates to substituted 5-nitrofurfurylideneamino-oxazolidinones with antimicrobial properties, to pharmaceutical and feedstuff compositions, as well as to methods for the treatment of microbial infections in mammals and to methods of protecting organic material against microbial attack.

More particularly, the present invention pertains to compounds of the formula I,

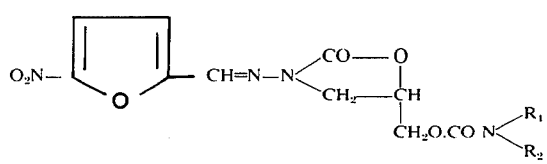

wherein
$R_1$ is hydrogen or a group —$COR_3$, wherein
$R_3$ is hydrogen, alkyl having at most six carbon atoms or alkenyl having from two to six carbon atoms, and
$R_2$ is hydrogen, alkyl having at most three carbon atoms or alkenyl having three or four carbon atoms, whereby at least one of the symbols $R_1$ and $R_2$ is different from hydrogen.

$R_2$ as an alkyl group may be methyl, ethyl, n-propyl or isopropyl. $R_3$ as an alkyl group may be e.g. methyl, ethyl, n-propyl, isopropyl, n-butyl, isobutyl, tertiarybutyl, n-pentyl or n-hexyl.

$R_2$ as an alkenyl group may be allyl, 2-methallyl, but-2-enyl (crotyl) or but-3-enyl. $R_3$ as an alkenyl group may be e.g. vinyl, allyl, 2-metallyl, but-2-enyl (crotyl), but-3-enyl, pent-1-enyl, pent-2-enyl, hex-1-enyl or hexadienyl; straight- or branched-chain alkenyl groups containing three or four carbon atoms are, however, particularly preferred.

The compounds of the present invention are prepared by reacting 5-nitro-2-furfurylideneaminohydroxymethyl-oxazolidinone having the formula II,

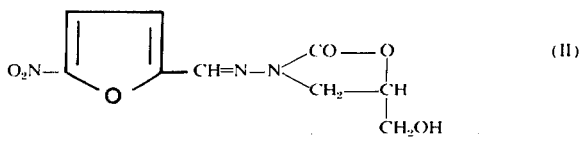

with an isocyanante $R_2NCO$ or an alkanoyl-isocyanate $R_3CO.NCO$, wherein $R_2$ and $R_3$ are as previously defined. Compounds of formula II are described and claimed in British Pat. No. 735,136.

The process may be carried out under a wide variety of reaction conditions, preferably at an elevated temperature within the range of from 75°C to the boiling point under reflux of the reaction mixture. Preferably, the reaction is carried out in the presence of an organic medium which is essentially inert under the reaction conditions, for example, dioxan at 100°C. A tertiary organic base is preferably present in the reaction mixture, for instance diazo-bicyclo-octane, in a catalytically active proportion.

If an isocyanate $R_2.NCO$ is used, the product is a compound having the formula IIIA,

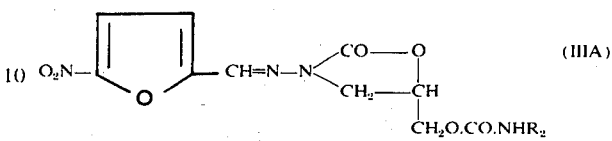

If an alkanoyl isocyanate $R_3$ CO NCO is used in the process, the product is a compound having the formula IIIB,

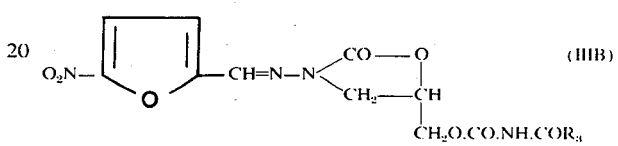

The present invention also provides a second process of producing a compound of formula I, which comprises reacting a 5-nitrofurfurylideneamino-2-oxazolidinone having the formula IIIA with an acylating compound containing the structure —$CO.R_3$, wherein $R_3$ is as previously defined.

The acylating compound used in the second process of the invention may be, for example, a carboxylic acid, carboxylic acid anhydride or mixed anhydride, or acid chloride. The process may be carried out by heating the reactants together, if desired in the presence of an acidic or basic condensing agent or dehydrating agent. Examples of condensing agents which may be used, include sulphuric acid and other acids, and trimethylamine, triethylamine, pyridine, dimethylaniline and other tertiary organic bases.

The present invention also provides a third process of producing a compound of formula I, which comprises reacting 5-nitro-2-furaldehyde or a compound capable of producing 5-nitro-2-furaldehyde under the reaction conditions with a substituted oxazolidinone having the formula IV,

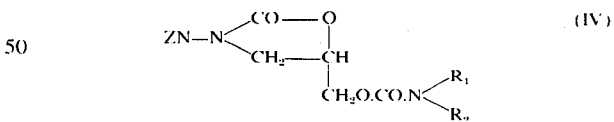

wherein
$R_1$ and $R_2$ are as previously defined, and
ZN is the $HO.CH_2NH$ group or an $NH.CO$— lower alkyl group or
Z is the divalent grouping:

wherein each of the groups $R_4$ and $R_5$ is an alkyl group having from one to five carbon atoms, or wherein $R_4$ is hydrogen and $R_5$ is a straight- or branched-chain alkyl group containing from one to five carbon atoms or an aryl group unsubstituted or bearing nitro-, alkyl- or halogen- substituents.

If either or both of the groups $R_1$ and $R_5$ in the grouping Z is alkyl, the alkyl radical is preferably methyl, ethyl, n-propyl or isopropyl.

If the group is $R_5$ is aryl, the aryl group is preferably a phenyl radical. If the group $R_5$ is an alkyl-substituted aryl group, it is preferably a tolyl or another methyl-substituted phenyl radical. If the group $R_5$ is halogen-substituted aryl, the halogen-substituted aryl group is preferably a monochloro-substituted phenyl- or monochloro-substituted alkylated phenyl radical. If the group $R_5$ is a nitro-substituted aryl, the nitro-substituted aryl group is preferably a mononitro-substituted phenyl radical.

Preferably, the grouping Z is an aralkylidene or an alkyl-, halogen- or nitro-substituted aralkylidene group. Examples of divalent grouping Z, which may be present in the oxazolidinone reactant of formula IV, include isopropylidene, benzylidene, p-methylbenzylidene, p-chlorobenzylidene and p-nitrobenzylidene groupings.

Instead of using 5-nitro-2-furaldehyde as reaxtant in the third process of the invention, a compound capable of producing 5-nitro-2-furaldehyde under the reaction conditions may be employed as a source of the 5-nitro-2-furaldehyde, for example, the diacetate of another functional derivative of 5-nitro-2-furaldehyde.

The third process of the invention may be conveniently carried out by heating the reactants together in an organic solvent. Preferably, the solvent used is substantially inert under the conditions of the reaction, and may be, for example, methanol, ethanol, isopropanol, n-butanol or other lower alkanol or a mixture of two or more thereof, or benzene, toluene or other aromatic hydrocarbon solvent or a mixture of two or more thereof. The reaction may be promoted, if desired, by having aqueous hydrochloric and/or other mineral acid, or glacial acetic acid present in the reaction mixture.

The present invention also provides a fourth process of producing a 5-nitro-2-furfurylideneaminooxazolidinone of formula I, which comprises nitrating a compound having the formula V,

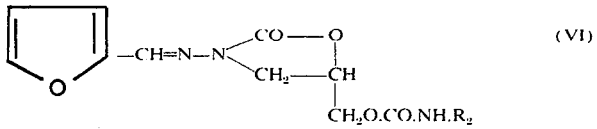

wherein $R_1$ and $R_2$ are as previously defined.

The nitration may be carried out with nitric acid under conditions conventional in nitrating substituted furyl derivatives, for instance by reacting in the presence of a water-binding agent; the water-binding agent may be, for example, sulphuric acid, but is preferably acetic anhydride. If desired, a proportion of acetic acid may be present in the reaction mixture. The nitration is preferably carried out at a temperature not exceeding 15°C using concentrated or fuming nitric acid. The reaction may be carried out, for instance, by adding in portions the oxazolidinone of formula V to a mixture of concentrated or fuming nitric acid, acetic acid and acetic anhydride while maintaining the temperature at from 5° to 15°C, preferably about 10°C. If desired, the compound of formula V may be produced during the nitration by reacting the compound having the formula VI, $$\text{(VI)}$$

together with an acylating agent containing the group —CO.$R_3$. The acylating agent may be, for example, a carboxylic acid anhydride or mixed anhydride, or an acid chloride, but is preferably acetic anhydride or other carboxylic acid anhydride.

The compounds of the present invention having the formula I, have valuable anti-microbial properties, and in particular have anti-bacterial, anthelminthic, coccidiostatic, trypanocidal and anti-malarial activity of value in human or veterinary medicine. The compounds are particularly valuable in the treatment of infections of the intestinal and urinary tracts. The compounds may also be used to protect a high molecular weight hydrophobic or other organic material susceptible to bacterial or other microbial deterioration by contacting the organic material with, impregnating in, or otherwise treating with, the compounds. The compounds also find application as growth-promoting additives to animal feedstuffs.

The anti-microbial properties of the compounds of the invention are demonstrated in a variety of standard in vitro and in vivo tests. Thus, 5-methylcarbamoyloxymethyl-3-(5-nitrofurfurylideneamino)-2-oxazolidinone, 5-ethylcarbamoyloxymethyl-3-(5-nitrofurfurylideneamino)-2-oxazolidinone and 5-allylcarbamoyloxymethyl-3-(5-nitrofurfurylideneamino)-2-oxazolidinone have been found to have an excellent activity against Staphylococcus, *Escherichia coli*, Klebsiella, Salmonella and other bacteria.

The toxity of the compounds of the invention as determined in mice on oral administration is of favourably low order.

For their internal use in mammals, the compounds of formula I are administered orally in daily dosages of from about 1 to about 50 mg/kg, although the exact dosage has to be adjusted to the type of infection, the age, weight and the particular condition of the host being treated.

The compounds of the present invention are administered advantageously in form of a pharmaceutical composition comprising an anti-microbially effective amount of a compound of formula I and a pharmaceutically acceptable carrier therefor.

The pharmaceutical compositions according to the invention contain at least one compound of formula I as active substance together with a conventional pharmaceutical carrier. The type of carrier actually used depends to a great extent on the intended application. For external application, for example in disinfecting healthy skin, disinfecting wounds and in treating dermatoses and infections of the mucous membranes caused by bacteria, ointments, powders and tinctures are particularly useful. The ointment bases may be anhydrous, for instance they can consist of mixtures of wool fat and soft paraffin, or they can consist of aqueous emulsions in which the active substance is suspended. Suitable carriers for powders are for instance, rice starch and other starches; the bulk weight of the carriers may be made lighter, if desired, for example by adding highly dispersed silicic acid, or may be made heavier by adding talcum. The tinctures may contain at least one active ingredient of the formula I in aqueous ethanol, in particular 45% to 75% ethanol, to which 10% to 20% of glycerol may be added, if desired. Solutions prepared from polyethylene glycol and other conventional solubility promoters, and also optionally, from emulsifying agents, may be used with particular advantage in disinfecting healthy skin. The content of active ingredient in pharmaceutical compositions for external application is preferably in the range of from 0.1% to 5%.

Gargles or concentrates for their preparation, and tablets for slow dissolution in the mouth, are suitable for the disinfection of the mouth and throat. The former are preferably prepared from alcoholic solutions containing 1% to 5% of active substance to which glycerol or flavourings may be added. Lozenges, that is solid dosage units, preferably have a relatively high content of sugar or similar substances and a relatively low content of active substance, for instance 0.2% to 20% by weight, as well as the usual conventional additives, such as binding agents and flavourings.

Solid dosage units, in particular tablets, dragees (sugar coated tablets) and capsules, are convenient for use in intestinal disinfection and for the oral treatment of urinary tract infections. These units preferably contain from 10% to 90% of the compound of the formula I, to enable the administration of daily dosages of from 0.1 to 2.5 grams to adults, or of suitably reduced doses to children. Tablets and dragee cores are produced by combining the compounds of formula I with solid, puverulent carriers such as lactose, saccharose, sorbitol, maize starch, potato starch or amylopectin, cellulose derivatives or gelatines, preferably with the addition of lubricants such as magnesium or calcium stearate or polyethylene glycols of suitable molecular weight. Dragee cores may then be coated, for example with concentrated sugar solutions which can also contain gum arabic, talcum and/or titanium dioxide, or they may be cooated with a lacquer dissolved in volatile organic solvents or a mixture of solvents. Dyestuffs can be added to these coatings, for instance to differentiate between varying dosages. Soft gelatine capsules consist, for example, of a mixture of gelatines and glycerol and may contain, for example, mixtures of the compound of formula I with polyethylene glycol. Hard gelatine capsules contain, for example, granulates of an active substance with solid pulverulent carriers, for instance lactose, saccharose, sorbitol, mannitol, starches (such as potato starch, maize starch or amylopectin), cellulose derivatives of gelatines, and magnesium stearate or stearic acid.

In all forms of administration, compounds of the formula I can be present as sole active ingredients or they can also be combined with other known pharmacologically active, and especially anti-bacterial and/or anti-mycotically or other anti-microbially active substances, for example to broaden the range of applications. They can be combined, for example, with 5,7-dichloro-2-methyl-8-quinolinol or other derivatives of 8-quinolinol, with sulfamerazine or sulfafurazole or other derivatives of sulfanilamide, with chloramphenicol or tetracycline or other anti-biotics, with 3,4',5-tribromosalicylanilide or other halogenated salicylanilides, with halogenated carbanilides, with halogenated benzoxazoles or benzoxazolones, or with polychlorohydroxy-diphenylmethanes, with halogen-dihydroxydiphenyl sulphides, with 4,4'-dichloro-2-hydroxydiphenylether or 2',4,4'-trichloro-2-hydroxydiphenylether or other polyhalogenhydroxydiphenylethers, or with bactericidal quaternary compounds or with certain dithiocarbamic acid derivatives such as tetramethylthiuram disulphide. Also, carriers which themselves have favourable pharmacological properties may be used, for instance sulphur, as a powder base or zinc stearate as a component of ointment bases.

The invention also provides a method of protecting an organic material susceptible to bacterial or other microbial attack which comprises treating the material with a compound of formula I. The organic material may be, for instance, a natural or synthetic polymeric material, a proteinaceous or carbohydrate substance, or a natural or synthetic fibre or textile material formed therefrom.

The invention also provides an animal feedstuff composition comprising a 5-nitro-2-furfurylideneaminooxazolidinone of formula I in an amount sufficient to promote the growth of the animal fed with the composition.

The following examples will serve to further typify the nature of the present invention, but they, in no way, should be construed as a limitation on the scope thereof. The temperatures are given in degree Centigrades.

EXAMPLE 1

A suspension of 25.5 g of 5-hydroxymethyl-3-(5-nitrofurfurylideneamino)-2-oxazolidinone, 10 ml of methyl isocyanate and 0.75 g of diazabicyclo-octane in 300 ml of dioxan is stirred at 100°C for 8 hours. The resulting clear solution is poured into 200 ml of water and the crystalline product is filtered, recrystallised from aqueous dimethyl formamide and dried.

The product is 5-methylcarbamoyloxymethyl-3-(5-nitrofurfurylideneamino)-2-oxazolidinone, having melting point 179°C.

EXAMPLE 2

The procedure described in Example 1 is carried out using ethyl isocyanate as starting material instead of methyl isocyanate, the reaction conditions being the same.

The product is 5-ethylcarbamoyloxymethyl-3-(5-nitrofurfurylideneamino)-2-oxazolidinone, having melting point 215°C.

EXAMPLE 3

The procedure described in Example 1 is carried out using propyl isocyanate as starting material instead of methyl isocyanate, the reaction conditions being the same.

The product is 3-(5-nitrofurfurylideneamino)-5-propylcarbamoyloxymethyl-2-oxazolidinone, having melting point 189° to 190°C.

EXAMPLE 4

The procedure described in Example 1 is carried out using allyl isocyanate as starting material instead of methyl isocyanate, the reaction conditions being the same.

The product is 5-allylcarbamoyloxymethyl-3-(5-nitrofurfurylideneamino)-2-oxazolidinone, having melting point 207°–208°C.

EXAMPLE 5

A mixture of 12.48 g of 5-methylcarbamoyloxymethyl-3-(5-nitrofurfurylideneamino)-2-oxazolidinone, 15 ml of acetic anhydride and 0.2 ml of concentrated sulphuric acid is heated at 100°C. for 6 hours. The crystalline product obtained on cooling is recrystallised from aqueous dimethyl formamide and dried.

The product is 5-(N-acetyl-N-methylcarbamoyloxymethyl)-3-(5-nitrofurfurylideneamino)-2-oxazolidinone, having melting point 200°C.

EXAMPLE 6

The procedure described in Example 5 is carried out using hexanoic anhydride as starting material instead of acetic anhydride, the reaction conditions being the same.

The product is 5-(N-hexanoyl-N-methylcarbamoyloxymethyl)-3-(5-nitrofurfurylideneamino)-2-oxazolidinone, having melting point 115°–116°C.

EXAMPLE 7

The procedure described in Example 6 is carried out using crotonic anhydride as starting material instead of acetic anhydride, the reaction conditions being the same.

The product is 5-(N-crotonoyl-N-methylcarbamoyloxymethyl)-3-(5-nitrofurfurylideneamino)-2-oxazolidinone, having melting point 168°–169°C.

EXAMPLE 8

The procedure described in Example 1 is carried out using N-acetyl isocyanate as starting material instead of methyl isocyanate, the reaction conditions being the same.

The product is 5-N-acetylcarbamoyloxymethyl-3-(5-nitrofurfurylideneamino)-2-oxazolidinone, as confirmed by NMR and IR spectroscopy, and apparently having melting point 153°C.

EXAMPLE 9

The procedure described in Example 1 is carried out using 3-furfurylidene-amino-5-hydroxymethyl-2-oxazolidinone, as starting material instead of 5-hydroxymethyl-3-(5-nitrofurfurylidene-amino)-2-oxazolidinone, the reaction conditions being the same.

The intermediate product thus prepared is 3-furfurylidene-amino-5-methylcarbamoyloxymethyl-2-oxazolidinone, having melting point 202°–203°C.

To a mixture of 10.3 g of acetic anhydride and 1.9 g of concentrated nitric acid is added 2.6 g of 3-furfurylideneamino-5-methylcarbamoyloxymethyl-2-oxazolidinone in portions with cooling. The resulting mixture is allowed to stand and the product filtered and dried.

The product is 5-(N-acetyl-N-methylcarbamoyloxymethyl)-3-(5-nitrofurfurylideneamino)-2-oxazolidinone, as shown by thin layer chromatography.

To 25 ml of concentrated sulphuric acid is added an intimately ground mixture of 0.85 g of sodium nitrate and 2.6 g of 3-furfurylideneamino-5-methylcarbamoyloxymethyl-2-oxazolidinone with stirring. After 1 hour the dark red solution is poured onto ice giving an oil containing 5-methylcarbamoyloxymethyl-3-(5-nitrofurfurylidene-amino)-2-oxazolidinone as shown by thin layer chromatography.

EXAMPLE 10

The procedure described in Example 1 is carried out using 3-benzylideneamino-5-hydroxymethyl-2-oxazolidinone as starting material instead of 5-hydroxymethyl-3-(5-nitrofurfurylideneamino)-2-oxazolidinone, the reaction conditions being the same.

The intermediate product thus prepared is 3-benzylideneamino-5-methylcarbamoyloxymethyl-2-oxazolidinone, having melting point 137°–138°C.

A mixture of 0.3 g of 3-benzylidene-amino-5-methylcarbamoyloxymethyl-2-oxazolidinone and dilute sulphuric acid is steam distilled. The resulting aqueous solution is treated with 0.3 g of 5-nitro-2-furaldehyde in 3 ml of ethyl alcohol.

The product is filtered and dried.

The product is 5-methylcarbamoyloxymethyl-3-(5-nitrofurfurylideneamino)-2-oxazolidinone, having melting point 179°C and being identical with the product of Example 1.

EXAMPLE 11

Preparation of Tablets

A mixture consisting of 100 g of 5-methylcarbamoyloxymethyl-3-(5-nitrofurfurylideneamino)-2-oxazolidinone, 60.0 g of maize starch and 35.0 g of lactose is moistened with a solution of 5.0 g of gelatin and 3.0 g of glycerol in 70.0 g of water and granulated through a sieve. The granulate is mixed with a mixture of 15.0 g of talcum, 10.0 g of maize starch and 2.0 g of magnesium stearate. The resulting mixture is pressed into 1,000 tablets, each containing 100 mg of active substance. If desired, the tablets can be grooved for better adaption of the dosage.

EXAMPLE 12

Preparation of Dragées
Composition for 1,000 dragées:

| | |
|---|---|
| I 5-Ethylcarbamoyloxymethyl-3-(5-nitrofurfurylideneamino)-2-oxazolidinone | 100.0 g |
| Maize starch | 27.0 g |
| Gelatin | 8.0 g |
| II Glycerol | 2.0 g |
| Distilled water q.s ad 100 ml | |
| Maize starch | 10.0 g |
| III Talcum | 7.0 g |
| Magnesium stearate | 1.0 g |
| | 155.0 g |
| IV White dragée coating | |
| Shellac | 2.0 g |
| Sugar | 50.0 g |
| Talcum | 38.0 g |
| Gum arabic | 7.4 g |
| Colloidal silicon dioxide | 2.2 g |
| Titanium dioxide | 0.4 g |

Composition I is granulated in the heat with composition II through a sieve of 1.2 mm mesh diameter. The dried granulate is mixed with composition III and the resulting mixture is pressed into 1,000 dragee cores. These are then coated with composition IV and dried. The dragees obtained weigh 255.0 mg and contain 100 mg of active substance.

EXAMPLE 13

Preparation of a Syrup

| Composition: | |
|---|---|
| 5-Allylcarbamoyloxymethyl-3-(5-nitrofurfurylideneamino)-2-oxazolidinone | 100.0 g |
| Colloidal silicon dioxide | 13.0 g |
| p-Hydroxybenzoic acid methyl ester | 1.4 g |
| p-Hydroxybenzoic acid propyl ester | 0.6 g |
| Citric acid | 1.0 g |
| Sodium cyclamate | 5.0 g |
| Distilled water | 610.0 g |
| Glycerol | 100.0 g |
| Sodium carboxymethyl cellulose | 4.0 g |
| Sugar | 320.0 g |
| | 1,155.0 g |

The active substance and the colloidal silicon dioxide are passed through a sieve of 1.2 mm diameter (I).

The p-hydroxybenzoic acid esters, the citric and the sodium cyclamate are dissolved in the given amount of boiling distilled water; the glycerol is then added to this solution (II). The sodium carboxymethyl cellulose and the sugar are thoroughly mixed (III).

Composition III is then added at 75°C to solution II under stirring until complete dissolution of III. The viscous, slightly turbid liquid is cooled to room temperature, filtered, if necessary, and mixed with composition I. Water is added to the resulting mixture up to the prescribed weight of 1,155.0 g, and the syrup obtained is homogenized.

What is claimed is:

1. A pharmaceutical composition useful for treating bacteria comprising an antibacterially effective amount of a compound having the formula

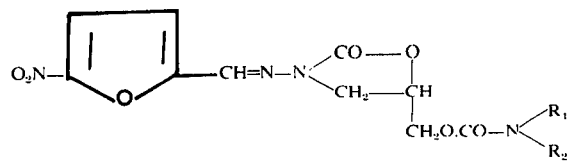

wherein $R_1$ is hydrogen or a group $COR_3$, wherein $R_3$ is hydrogen, alkyl having at most six carbon atoms or alkenyl having from two to six carbon atoms, and $R_2$ is hydrogen or alkyl having at most three or four carbon atoms, whereby at least one of the symbols $R_1$ and $R_2$ is different from hydrogen, and a pharmaceutically acceptable carrier therefor.

2. A method for the treatment of a mammal suffering from a bacterial infection, which method comprises administering to said mammal an anti-bacterially effective amount of a composition according to claim 1.

3. A method of protecting an organic material susceptible to bacterial attack, which comprises applying to the material an antibacterially effective amount of the composition.

* * * * *